United States Patent Office 3,278,122
Patented Oct. 11, 1966

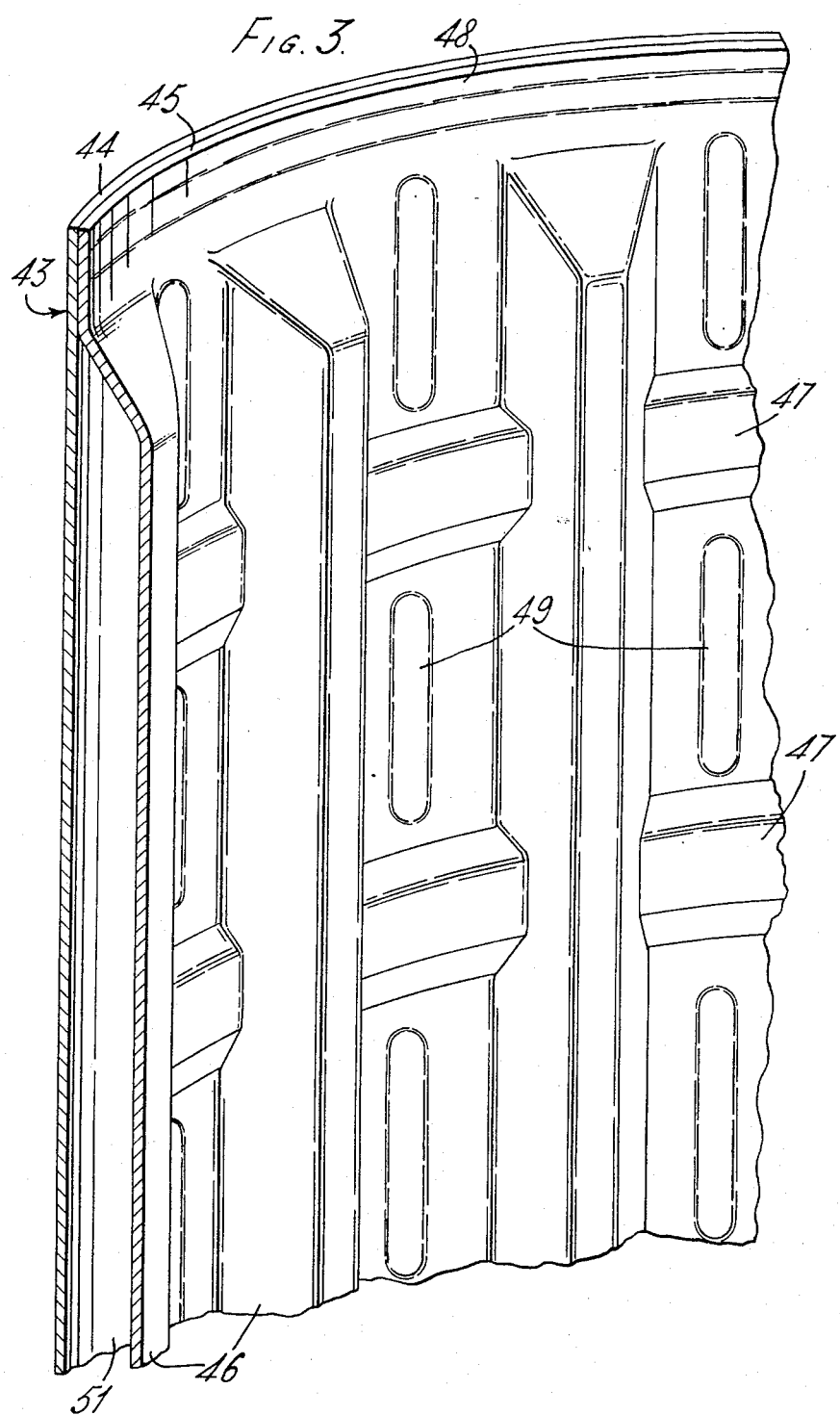

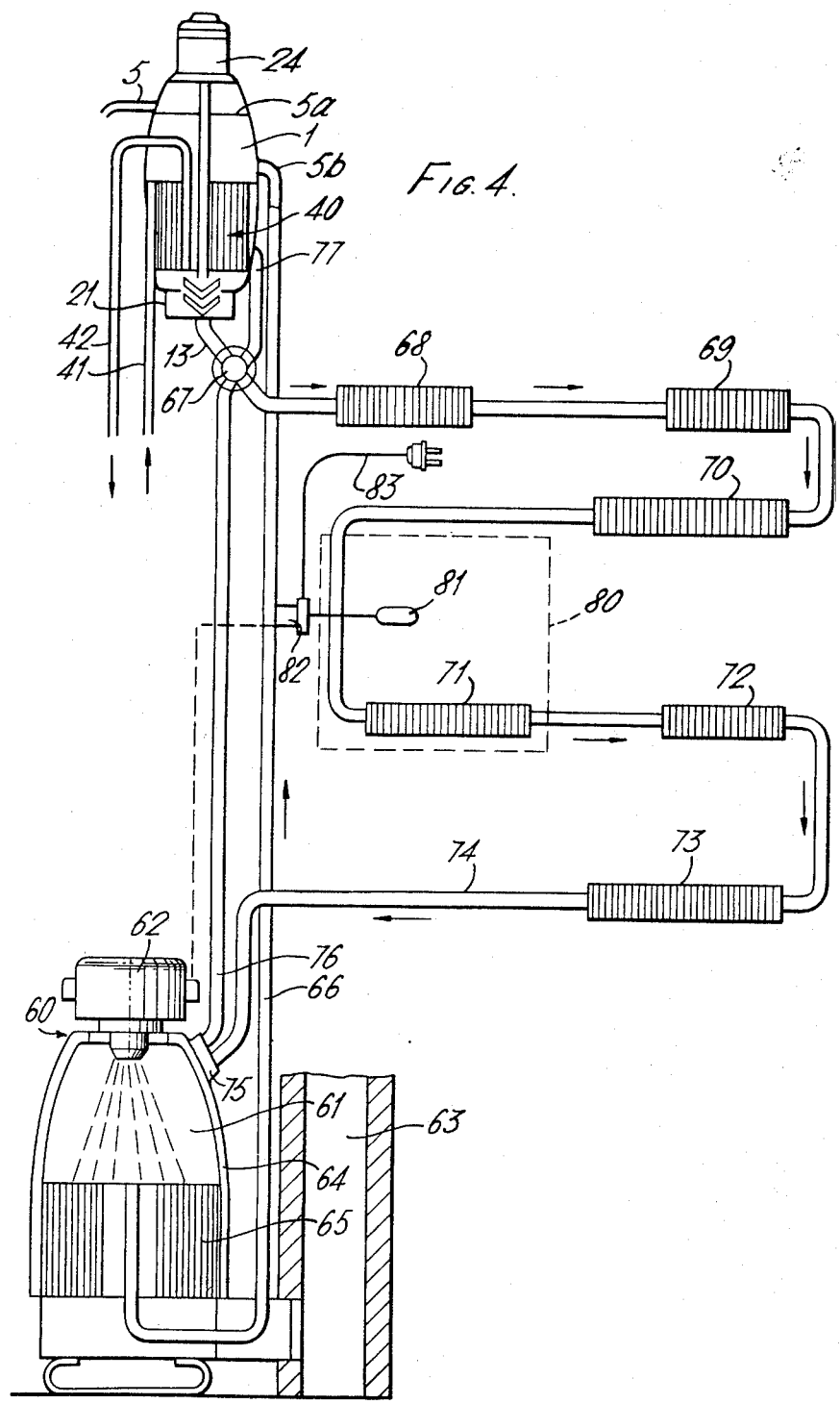

3,278,122
CENTRAL HEATING SYSTEMS
Nikolaus Laing, Aldingen, near Stuttgart, Germany, assignor, by mesne assignments, to Laing Vortex, Inc., New York, N.Y.
Filed Mar. 2, 1964, Ser. No. 348,533
9 Claims. (Cl. 237—19)

This invention relates to forced-circulation central heating systems and this application in part relates to subject matter disclosed and claimed in my copending application Serial No. 1,922 filed January 12, 1960, now abandoned.

Forced-circulation central heating systems have hitherto commonly comprised a circulation pump located close to the boiler and driven by an electric motor of special type, the motor having its armature and bearings situated with the pump rotor in a water-filled space and its stator outside the water and separated from the rotor by a tube of non-magnetic material. Due to the necessarily relatively large gap between the magnetic material of the stator and that of the armature such a motor is inefficient as compared with ordinary motors of similar power; motor cooling is complicated by the fact that the heat generated has to be dissipated at the temperature of the hot water being pumped: for these reasons the motor has to be relatively large. It will be readily understood therefore that these special motors for central heating pumps suffer from the twin disadvantages of high first cost and heavy running expense.

In contrast to the conceptions of the prior art the invention proposes in a forced-circulation central heating system to combine the circulation pump with the high-level tank for the system, i.e. the expansion tank, and to provide for the pump a driving motor of normal type located above the water level. The invention accordingly provides apparatus comprising a high level tank having means defining a liquid level; a liquid circulation pump below said liquid level and having a chamber with an inlet in communication with the tank, and an outlet, and a rotor in the chamber arranged for rotation; and a driving motor located above the liquid level and drivingly connected to said pump rotor. It will be appreciated immediately that the invention enables substantial economies to be obtained, in that the pump motor can be of a standard type produced cheaply in great quantity and having a satisfactory efficiency.

In a preferred embodiment of the invention the pump rotor chamber is mounted on the lower end of a connecting shaft which is supported at its upper end above the liquid level and which is driven by the motor: the pump rotor is of a type such as to create a swirl in the chamber and is constructed to have an average density less than that of the liquid, so that it is centered in the chamber by the centripetal forces set up in operation. This arrangement obviates the need for a bearing below the liquid level, such as would be sensitive to dirt in the water, and possibly noisy. Conveniently the motor is arranged with its shaft vertical, and the connecting shaft has its upper end directly connected to the lower and of the motor shaft.

According to a subsidiary feature of the invention a heat exchanger for heating water for hot water taps is located in the high-level tank; the high-level tank, circulation pump and motor, and tap water heat exchangers are then all incorporated in one and the same unit.

A preferred embodiment of the invention will now be described with reference to the accompanying drawings, in which:

FIGURE 3 is a perspective sectional view of a broken-away portion of the tap water heat exchanger;

FIGURE 3a is a frontal view of a broken-away portion of the heat exchanger;

FIGURE 3b is a scrap section on the line IIIB—IIIB of FIGURE 3a, and

FIGURE 4 is a diagram of a central heating system incorporating the apparatus of FIGURE 1.

Figure 1:
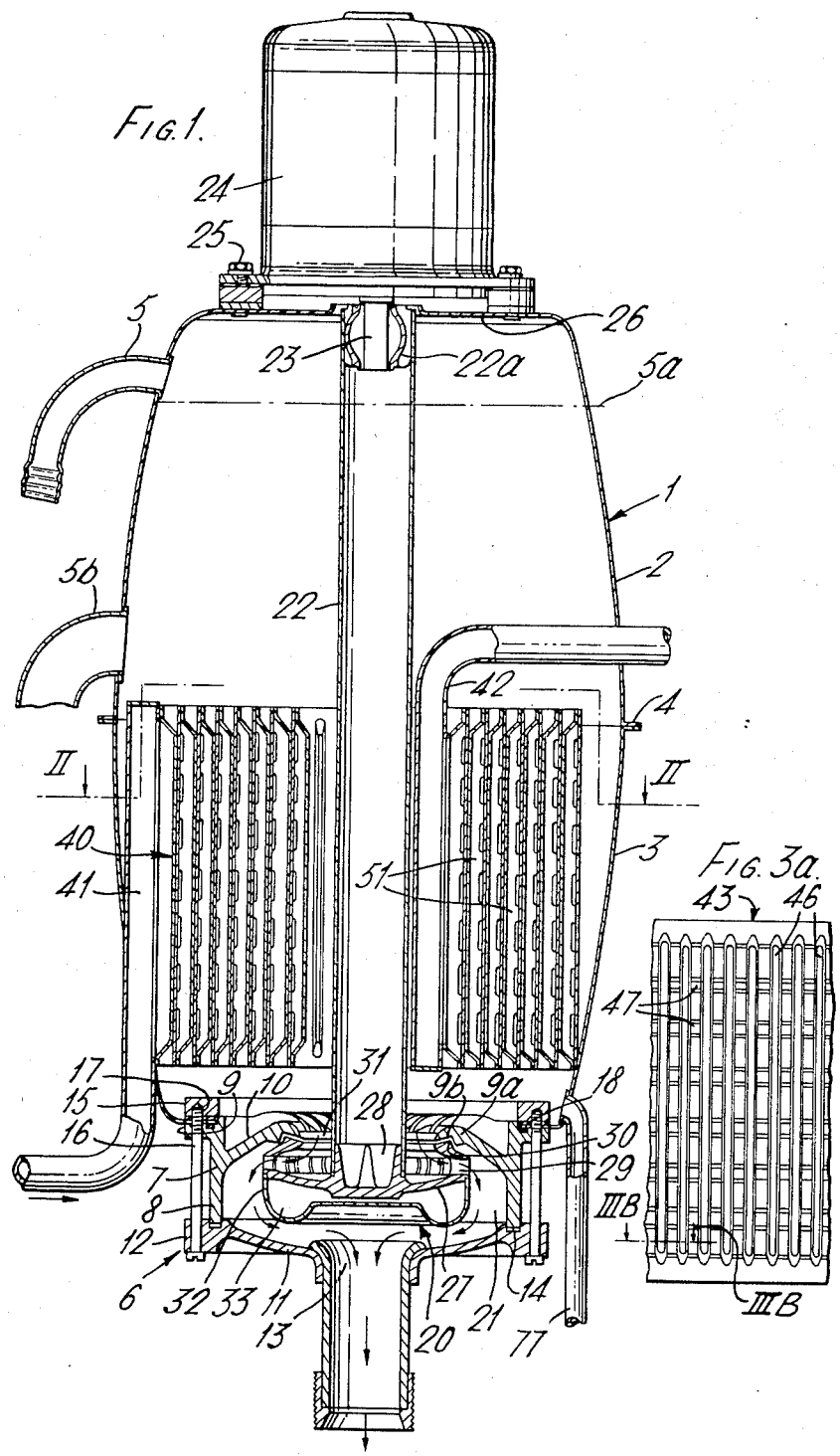
FIGURE 1 is a vertical section of a high-level tank for a central heating system, the tank being combined with a circulation pump and motor therefor and a tap water heat exchanger.
Figure 2:
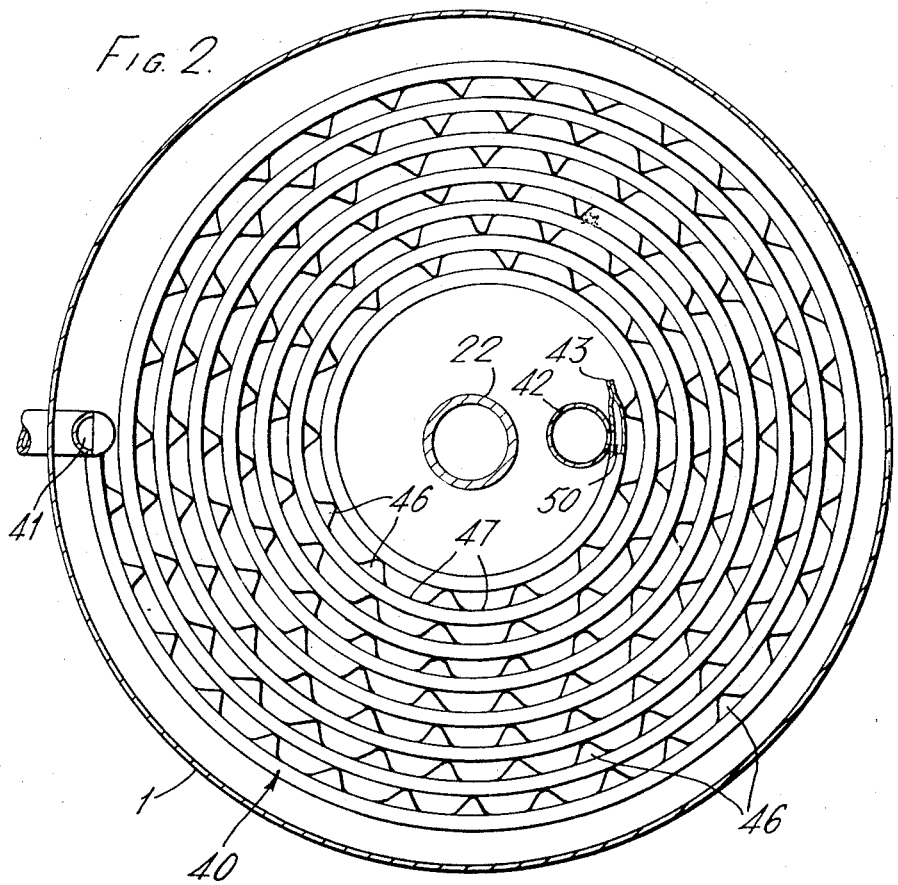
FIGURE 2 is a horizontal section of the FIGURE 1 apparatus, taken on the line II—II in that figure.
Figure 3B:
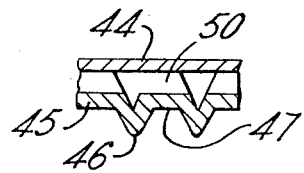

Referring to the drawings, FIGURE 1 illustrates a high-level, or expansion, tank designated generally 1 for a central heating system such as that of FIGURE 4, to be discussed later. The tank 1 consists essentially of two deep-drawn metallic cups 2, 3 aligned on a vertical axis with their open ends facing and connected by welding together out-turned flanges 4 at such ends. An overflow pipe 5 defines the water level in the tank 1, this level being indicated by the chain-dotted line 5a. A main water inlet 5b is connected to the tank 1 just above the flanges 4.

A pump housing shown generally at 6 is mounted coaxially upon the bottom of the tank 1. The pump housing 6 comprises a body member 7 providing a cylindrical outer wall 8 with a flange 9 at the top, and an annular top wall 10 extending inwardly and upwardly from the cylindrical wall: the housing 6 further comprises a bottom wall 11 having a peripheral flange 12 and defining a central outlet 13 and an annular groove 14 receiving the lower end of the cylindrical wall 8, and an upper securing ring 15. A series of long bolts 16 extend through the flanges 12, 9 and into threaded holes 17 in the securing ring: tightening these bolts 16 holds the parts 7, 11 and 15 together and clamps an annular edge portion 18 of the bottom wall of the tank 1 between the flange 9 and the ring, whereby the pump housing 6 is supported from the tank.

A pump rotor of centrifugal type designated generally 20 is situated within the chamber 21 defined by the pump housing 6, and well-spaced from the outer wall 8 thereof: the rotor 20 is mounted for rotation upon the lower end of a tubular drive shaft 22 extending coaxially through the tank 1 and supported at its upper end through an elastic coupling element shown diagrammatically at 22a upon the vertical shaft 23 of an electric motor 24 of normal air cooled type bolted at 25 to the top wall 26 of the tank. The pump rotor 20 comprises a rotor disc 27 having a central upstanding ribbed flange 28 engaged within the lower end of the drive shaft 22 and carrying a ring of blades 29 upstanding about the periphery of the disc. A shroud ring 30 overlies the top of the blades 29 and cooperates with the inner edge of the annular top housing wall 10, which lies adjacent to said ring, to define with the drive shaft 22 an annular inlet 31 to the pump chamber 21. On its lower side the rotor disc 27 carries a sheet metal cup 32 which defines therewith an air-filled sealed space 33: the rotor 20 is designed so that on account of this space 33 its average density is less than that of water.

As so far described the apparatus operates as follows. Rotation of the pump rotor 20 by the motor 24 through the drive shaft 22 sets up a rotation in the water within the pump chamber 21: because the rotor 20 has an average density lower than that of the water, it is centered in the chamber by the centripetal forces acting. Thus the rotor 20 requires no bearing below the water level 5a such as might be liable to damage and might set up noise. The rotor 20 is sufficiently supported from the bearings of the motor 24 itself, through the elastic coupling element 22a between the motor shaft 23 and drive shaft 22, by reason of this automatic centering. The pump rotor 20 draws water from the tank 1 through the annular inlet 31 and expels the water outwardly through the ring of blades 29 into the outer part of the chamber 21, whence it leaves through the outlet 13.

Within the tank is situated a heat exchanger designated generally 40 (see particularly FIGURES 1, 2, 3, 3a and 3b) having an inlet pipe 41 for connection respectively to the city water main or a cold water tank, and an outlet pipe 42 for connection to the hot water taps of the building in which the apparatus is situated: by means of the heat exchanger 40 the water of the central heating system is made to heat the tap water.

The heat exchanger 40 has the form of a strip-like member 43 providing water passageways over its length and coiled spirally about the axis of the tank 1 so that the spiral surrounds the pump rotor drive shaft 22, the inlet pipe 41 being connected to the member over the length of its outer end edge and the outlet pipe 42 over the length of its inner end edge. The member 43 is formed of a pair of sheet metal strips 44, 45, the outer strip 44 being plain and the inner being formed with a series of deep vertical indentations 46 extending transverse to its length and a series of shallower horizontal indentations 47 extending lengthwise of the strip. The strips 44, 45 are secured together by seam welding or brazing at their upper and lower abutting edge portions, as shown in FIGURE 3 at 48, and also between the indentations 46, 47, as shown at 49. By reason of the indentations 46, 47 the strips 44, 45 provide between them a series of horizontal passageways 50 extending over the length of the member 43 and interconnecting the inlet and outlet pipes 41, 42, and a series of vertical transverse vertical passageways 51 interconnecting the horizontal passageways and increasing the heat-transferring area of the heat exchanger. The member 41 is wound to bring the tops of the deeper indentations 46 against the outside surface of the strip 44 of the next convolution of the member, thus rigidifying the whole construction.

It is to be appreciated that the heat exchanger 40 described above permits free access of water within the tank 1 between the convolutions of the spirally wound member 1 so that almost the whole area thereof is available for heat transfer, while producing a rigid pressure-resistant construction as required to withstand the city water pressure, without necessitating the use of material of excessively heavy gauge.

In FIGURE 4 the apparatus of FIGURE 1 is shown connected in a central heating system. At a low point in the system is provided a boiler 60 having a combustion chamber 61 supplied by a motor-driven oil burner device 62 and exhausting up a chimney 63. The upper part of the boiler 60 provides a water-jacket 64 communicating with a heat exchanger 65 within the combustion chamber. Water heated in the boiler 60 is led off from the heat exchanger by a pipe 66 connected to the main water inlet 5b of the high-level tank 1. Water leaving the outlet 13 of the pump chamber 21 associated with that tank is led through a four-way valve 67 and thence through a number of space-heating units 68, 69, 70, 71, 72 and 73 connected in series in a single pipe line designated generally 74, back to a mixing valve 75 at the top of the boiler 60 which leads a portion of the return flow into water-jacket 64 of the boiler and another portion via the pipe 76 and valve 67 to a secondary water inlet 77 of the high-level tank which terminates adjacent the pump chamber inlet 31. The mixing valve 75 is set by manual and/or thermostatically controlled devices (not shown) to supply a proportion of the return water to the pump inlet and thereby reduce the temperature of the water circulated through the space-heating units 68, 69, 70, 71, 72 and 73 to a desired value. The space-heating units 68, 69, 70, 71, 72 and 73 may vary in number and are preferably such as described in my copending United States application Serial No. 348,537 of even date herewith, being also a continuation-in-part of my earlier application Serial No. 1,922 filed January 12, 1960. Briefly these units comprise a heat exchanger carrying the circulating water and arranged in the closed upper part of a casing having an air inlet and outlet below the heat exchanger and a blower to force air through it, the arrangement preventing any substantial flow of heat from the heat exchanger except when the blower is operating: the blower may be driven by a turbine in the circulating water.

The number and size of the various units will depend on the requirements of the particular system, as will be understood. The invention contemplates the use of space-heating units other than those of my copending application; the units 68, 69, 70, 71, 72 and 73 interconnected in series in the single pipe line 74 may thus be replaced by a conventional radiator system with the individual radiators parallel-connected to a circulating pipe.

The four-way valve 67 can be set to allow a direct connection from the pump outlet 13 through pipe 76 to the boiler when, as in summer, it is desired to by-pass the space-heating units 68, 69, 70, 71, 72 and 73. In this setting of the valve 67 the system operates simply to heat the tap water.

The oil burner 62 may be controlled thermostatically in dependence upon the temperature within a key room, so that the burner is switched on when the temperature drops below a value which can be set at will. At the same time, the burner may be shut off when the temperature in the pipe 66 conveying water from the boiler 60 to the high-level, or expansion, tank 1, reaches a given maximum. In FIGURE 4, the room is indicated by the reference numeral 80, and contains a temperature sensitive device 81 connected to a control unit 82 associated with the pipe 66, and connected to a source of electrical energy shown schematically at 83. The control unit 82 will pass current to the motor of the burner 62 when the element 81 detects a temperature below the pre-set value, and the unit 82 detects a temperature in the water below the fixed maximum.

In place of the centrifugal pump illustrated in FIGURE 1, an axial pump which creates a swirl in the pump chamber 21 could be used, or a pump where the flow is partly centrifugal, and partly axial. Instead of having the pump rotor 20 of an average density less than that of the water, the invention contemplates a water-lubricated bearing adjacent a submerged pump rotor of normal density. Bearing lubrication with hot water presents considerable difficulty, having in mind that water is in any event not particularly viscous, and hot water is some three times less viscous than cold water. However, it has been found that a large diameter bearing, with a large clearance (as much as a millimeter) between the journal surfaces, can be satisfactorily used, with hot water lubrication, to centralize a submerged pump rotor, where a normal-diameter small-clearance journal bearing would fail after only a short period of service. The reason for this is believed to be due to the large linear speeds obtained even with normal-speed pump motors at the large diameter, and the fact that with large linear speeds between the journal surfaces the lubricating film will be larger for a given viscosity.

It will be seen that in FIGURE 1 the pump wall 9 of the pump housing 6 terminates inwardly in a thickened ring 9a having a cut-back 9b on its lower face mating with corresponding surfaces on the shroud ring 30 of the rotor. Though principally this construction has been adopted to prevent water under pressure in the pump chamber 32 from returning to the inlet 31, the construction is also capable of use as a submerged water lubricated bearing in the event that the rotor 20 is re-designed to have a density greater than that of water, or to be used in sufficient swirl to be self-centering.

I claim:

1. In a forced-circulation central heating system apparatus comprising a high level expansion tank having means defining a liquid level; a liquid circulation pump below said liquid level and having a chamber with an inlet in communication with the tank, an outlet, and a rotor arranged concentrically in the chamber for rotation about a vertical axis to produce a swirl in said chamber, the rotor having an average density less than that of the liquid; a driving motor located above the liquid level; and a shaft which is supported at its upper end, which is driven by the motor which depends vertically into the liquid, and which mounts the pump rotor at its lower end, the rotor being in operation centered in the chamber by virtue of the density of the rotor being less than that of the liquid and by virtue of the swirl in the chamber.

2. In a forced-circulation central heating system apparatus comprising a high level expansion tank having means defining a liquid level; a liquid circulation pump below said liquid level and having a chamber with an inlet in communication with the tank, an outlet, and a rotor arranged concentrically in the chamber for rotation about a vertical axis to produce a swirl in said chamber, the rotor having an average density less than that of the liquid; driving motor located above the liquid level and mounted with its shaft vertical; and a connecting shaft depending vertically into the liquid and having an upper end supported by and drivingly connected to the motor shaft and a lower end mounting the pump rotor, the rotor being in operation centered in the chamber by virtue of the density of the rotor being less than that of the liquid and by virtue of the swirl in the chamber.

3. Apparatus as claimed in claim 2, wherein the pump rotor is of centrifugal type.

4. Apparatus as claimed in claim 2, wherein the connecting shaft is tubular and wherein the average density of said shaft is less than that of the liquid.

5. Apparatus as claimed in claim 2, wherein the connecting shaft is coupled to the motor shaft by an elastic coupling.

6. Apparatus as claimed in claim 2, wherein the motor is mounted on a top wall of the tank and the pump chamber is formed at the bottom of the tank.

7. Apparatus as claimed in claim 2, including a hot liquid inlet to said tank below the liquid level and spaced vertically from the pump chamber inlet, and a heat exchanger in the tank below the inlet to the tank and above the pump chamber inlet, the heat exchanger having an inlet for cold water and an outlet for supply of service water.

8. A forced-circulation central heating system comprising a boiler, a high level expansion tank having means defining a water level therein at atmospheric pressure, an electric-motor driven circulation pump associated with the tank and having an inlet receiving hot water directly from adjacent the bottom of the tank, a service water heat exchanger in the tank, a pipe leading hot water from the boiler to the tank at a level above the heat exchanger, a plurality of space-heating room units, pipe means receiving water from the pump, interconnecting the room units and terminating at the boiler, and a further pipe connecting the pipe means adjacent the boiler to the inlet side of the pump to lead a proportion of cooled water thereto for mixing therein with the hot water from the tank.

9. A system as claimed in claim 8, including valve means settable to return water from the tank direct to the boiler through said further pipe and thereby bypass the room units.

References Cited by the Examiner

UNITED STATES PATENTS

| | | | |
|---|---|---|---|
| 405,504 | 6/1889 | Richardson | 237—66 X |
| 1,661,368 | 3/1928 | Hudson | 237—63 |
| 2,017,302 | 10/1935 | Yoder | 237—63 X |
| 2,246,138 | 6/1941 | Lum | 237—8 |
| 2,290,347 | 7/1942 | Moore et al. | 237—19 |
| 2,768,508 | 10/1956 | Guyton | 165—170 X |
| 3,007,680 | 11/1961 | Harris | 165—170 X |

OTHER REFERENCES

German printed application 1,093,536, November 1960.

EDWARD J. MICHAEL, *Primary Examiner.*